United States Patent
Richard

(10) Patent No.: US 6,447,680 B1
(45) Date of Patent: Sep. 10, 2002

(54) DOUBLE PASS SEPTIC TANK OUTLET FILTER

(76) Inventor: James Richard, 20 Woodland Dr., Canton, CT (US) 06019

( * ) Notice: Subject to any disclaimer, the term of this patent is extended or adjusted under 35 U.S.C. 154(b) by 0 days.

(21) Appl. No.: 09/841,528

(22) Filed: Apr. 24, 2001

(51) Int. Cl.[7] .................. B01D 35/027; B01D 36/04; B01D 29/15; B01D 29/23; B01D 29/56
(52) U.S. Cl. .............. 210/532.2; 210/335; 210/336; 210/238; 210/459; 210/463
(58) Field of Search .................. 210/314, 316, 210/317, 336, 339, 463, 455, 459, 532.2, 335, 238

(56) References Cited

U.S. PATENT DOCUMENTS

| | | | |
|---|---|---|---|
| 2,363,009 A | * | 11/1944 | Lewis |
| 2,868,382 A | * | 1/1959 | Best |
| 2,900,084 A | | 8/1959 | Zabel |
| 3,332,552 A | | 7/1967 | Zabel |
| 3,675,776 A | * | 7/1972 | Campo |
| 3,970,566 A | * | 7/1976 | Rosaen |
| 4,179,372 A | | 12/1979 | Rosaen |
| 4,439,323 A | | 3/1984 | Ball |
| 4,692,247 A | * | 9/1987 | Orlans |
| 5,382,357 A | | 1/1995 | Nurse |
| 5,569,387 A | * | 10/1996 | Browne et al. |
| 5,580,453 A | * | 12/1996 | Nurse, Jr. |
| 5,683,577 A | * | 11/1997 | Nurse, Jr. |
| 5,871,652 A | * | 2/1999 | England et al. |
| 5,885,452 A | * | 3/1999 | Koteskey |

* cited by examiner

Primary Examiner—Thomas M. Lithgow
(74) Attorney, Agent, or Firm—St. Onge, Steward, Johnston & Reens LLC

(57) ABSTRACT

A filter for filtering particulate matter from liquids adapted to be received in a filter casing having a casing wall and an outlet is provided. The filter includes a filter element having a plurality of openings therein for filtering particulate matter while allowing liquids to pass therethrough, the filter element comprising a first section located proximate to the outlet and a second section adjacent to the first section. The filter element is receivable in the casing and is spaced apart therefrom such that the filter element and the casing wall define a space therebetween. A seal separates the first and second sections and prevents the flow of liquid therearound in the space. The seal is located below the outlet. A lower end member closes a lower end of the filter element, the lower end member preventing the flow of unfiltered liquid and particulate matter into the filter element.

16 Claims, 4 Drawing Sheets

DOUBLE PASS SEPTIC TANK OUTLET FILTER

FIELD OF THE INVENTION

The present invention relates to an improved fluid filter, and more particularly to a fluid filter which is particularly adapted to filter particulate matter from liquids such as in the effluent from wastewater treatment facilities such as septic tanks.

BACKGROUND OF THE INVENTION

Devices for filtering particulate matter from liquids, and even those specifically directed to the removal of effluent from wastewater treatment facilities such as septic tanks, are well known. However, although the prior art is highly developed, certain deficiencies in this general area exist.

U.S. Pat. Nos. 2,900,084, 3,332,552, 4,439,323 and 4,179,372 all disclose filters for the removal of solid matter from fluids, particularly for treatment of sewage in septic tanks and for removal of other solid matter from liquids. While some of these prior art devices have proven effective, they are expensive to produce and have resulted in mechanical and other problems associated with the plugging and cleaning.

More recent U.S. Pat. No. 5,382,357 has stated as its objective to remedy the problems associated with the above-mentioned prior art devices. This reference discloses a filter device which includes a tubular filter element (11,13) with a series of slots (12,14) of selected width extending through the tubular element (11,13). The element (11,13) has a central opening (7,8) and can be received in a casing (3) to form an annular area (16) between the tubular filter element (11,13) and the casing (3) so the central opening (7,8) is open to receive the fluid to be filtered as the fluid flows through the slots (12,14) from the central opening (7,8) to the annular area (16). The casing (3) can also include an outlet (2) from the annular area (16) so the fluid can be emitted from the assembly. A seal (24) can be provided between the tubular element (11,13) and the inside of the casing (3) at a location below the slots (12,14) in the tubular element (11,13) and above the outlet (2) from the casing (3).

While this filter may have remedied some of the problems associated with the earlier prior art, it suffers from a number of disadvantages of its own. One of such disadvantages is that it is only useful for filtering relatively large particles. While the size of slots (12,14) may be varied, if they are made small enough to filter out smaller particles, they will be prone to being quickly clogged by larger particles, as the filter is only a single-pass filter. That is, fluid flows up through the interior of the filter and then only once through any type of a filter element.

A related problem is that even if the slots (12,14) are properly sized to filter out the desired particles, the filter is still prone to clogging. This is true because the surface area of the filter is limited by the length of the casing (3). More specifically, for the filter to function properly, there must be a seal (24) between the tubular element (11,13) and the inside of the casing (3) at a location below the slots (12,14). If there were no seal, fluid could flow unfiltered up through annular area (16) and out through outlet (2). Thus, if casing (3) is short, the filter will necessarily have to be short, and the surface area of the filter (i.e., the area covered by slots) will be small and prone to rapid clogging.

What is desired, therefore, is a filter for filtering particulate matter from liquids which is inexpensive to produce, which is useful for filtering small as well as large particles, which is not prone to rapid clogging, and which is not limited in size by the length of the casing in which it is inserted.

SUMMARY OF THE INVENTION

Accordingly, it is an object of the present invention to provide a filter for filtering particulate matter from liquids which is inexpensive to produce.

Another object of the present invention is to provide a filter for filtering particulate matter from liquids having the above characteristics and which is useful for filtering small as well as large particles.

A further object of the present invention is to provide a filter for filtering particulate matter from liquids having the above characteristics and which is not prone to rapid clogging.

Still another object of the present invention is to provide a filter for filtering particulate matter from liquids having the above characteristics and which is not limited in size by the length of the casing in which it is inserted.

These and other objects of the present invention are achieved by provision of a filter for filtering particulate matter from liquids adapted to be received in a filter casing having a casing wall and an outlet. The filter includes a filter element having a plurality of openings therein for filtering particulate matter while allowing liquids to pass therethrough, the filter element comprising a first section located proximate to the outlet in the casing and a second section adjacent to the first section. The filter element is receivable in the casing and spaced apart from the casing wall such that the filter element and the casing wall define a space therebetween. A seal separates the first section and the second section of the filter element and prevents the flow of liquid therearound in the space between the filter element and the casing wall. The seal is located below the outlet in the casing. A lower end member closes a lower end of the filter element, the lower end member preventing the flow of unfiltered liquid and particulate matter into the filter element. Thus, fluid is forced to flow from outside the filter element to inside the filter element through the second section, thereby filtering the fluid a first time, and then from inside the filter element to outside the filter element and out through the outlet through the first section, thereby filtering the fluid a second time.

The lower end member may comprise a filter material having a plurality of openings therein, or may comprise a solid member having no openings therein, so long as the lower end member prevents the flow of unfiltered liquid and particulate matter into the filter element. The filter element may comprise a rigid material having a plurality of openings therein, or may comprise a flexible mesh or screen material having a plurality of openings therein.

Preferably, the filter also includes a rigid insertion member and an upper end member attached to an upper end of the filter element, the upper end member having a hole therein adapted to receive the insertion member therein. When such is the case, the lower end member preferably has a recess therein adapted to receive the insertion member such that the insertion member exerts a force on the lower member as the filter is being inserted into the casing. Such is most desirable when the filter element comprises a flexible mesh or screen material so that the insertion member inhibits the filter element from collapsing. Most preferably, the insertion member is removable from the filter element, and the lower end member includes a taper surrounding the recess therein for facilitating insertion of the insertion member into the recess therein. When the insertion member is removable from the filter element, it is also most preferable that the upper end member and the insertion member include a means for detachably connecting the insertion member to the filter element.

When an upper end member is attached to an upper end of the filter element, is also preferable that the upper end member have a seal preventing the flow of liquid therearound in the space between the filter element and the casing wall, the seal being located above the outlet in the casing. Such is preferable so that liquid flowing out through the first section of the filter element is forced to flow through the outlet in the casing.

Also preferable is if the lower end member comprises a plurality of centering elements extending radially outwardly therefrom which are sized, shaped and positioned to engage an inner surface of the casing wall such that the filter element is centered within the casing, while still allowing liquid to flow therearound. Moreover, the filter preferably also includes at least one strengthening ring peripherally attached to the filter element to provide strength and rigidity thereto. The strengthening ring may comprise a plurality of centering elements extending radially outwardly therefrom similar to the centering elements of the lower end member.

Most preferable is if the plurality of openings in the first section of the filter element are smaller than the plurality of openings in the second section of the filter element, such that larger particles of matter are first filtered out by the second section during a first pass of the liquid through the filter element before smaller particles of matter are filtered out by the first section during a second pass of the liquid through the filter element. When such is the case, the larger particles in the liquid cannot prematurely clog the smaller openings of the first section, as they are filtered out during the first pass through the filter. Also most preferable is if the second section of the filter element extends out beyond a lower end of the casing.

The invention and its particular features and advantages will become more apparent from the following detailed description considered with reference to the accompanying drawings.

DETAILED DESCRIPTION OF THE INVENTION

Figures 1, 2, 3:
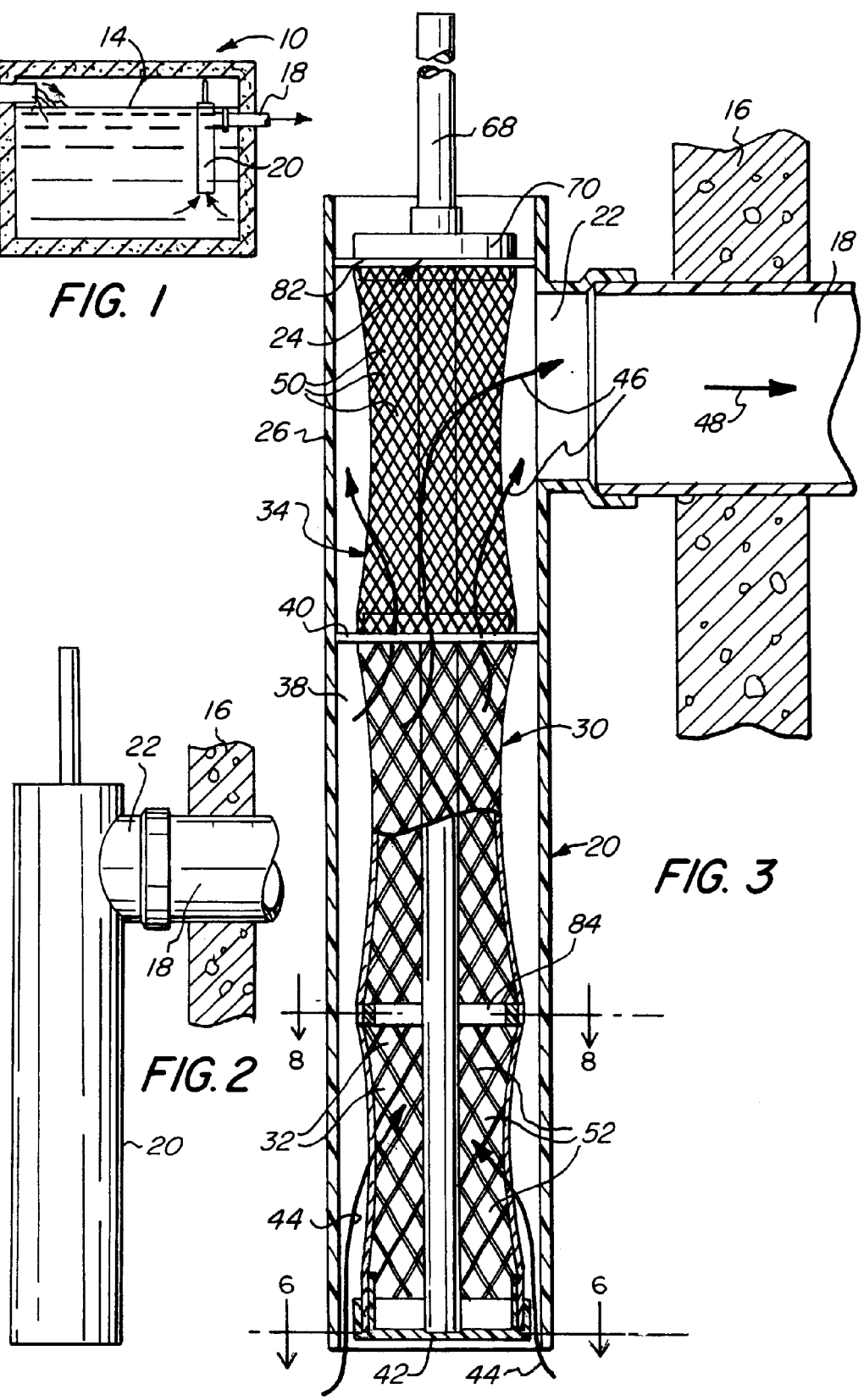
FIG. 1 is a side elevational view of a septic tank system in connection with which a filter for filtering particulate matter from liquids in accordance with the present invention can be used.
FIG. 2 is an enlarged side elevational view a filter casing portion of the septic tank system of FIG. 1.
FIG. 3 is side cross-sectional view, partially broken away, of a filter casing portion of a septic tank system having installed therein a filter for filtering particulate matter from liquids in accordance with the present invention.

Referring first to FIG. 2 a septic tank system 10 in connection with which a filter for filtering particulate matter from liquids in accordance with the present invention can be used is shown. The fluid to be filtered is admitted through a tank inlet 12 as shown, and a level 14 of the fluid is maintained in the tank 16 as filtered liquid is emitted by means of a tank outlet 18. The liquid is filtered by a filter which is located within a filter casing 20 which includes an outlet 22 in fluid communication with the tank outlet 18, which extends through a wall of the tank 16.

Figure 4:
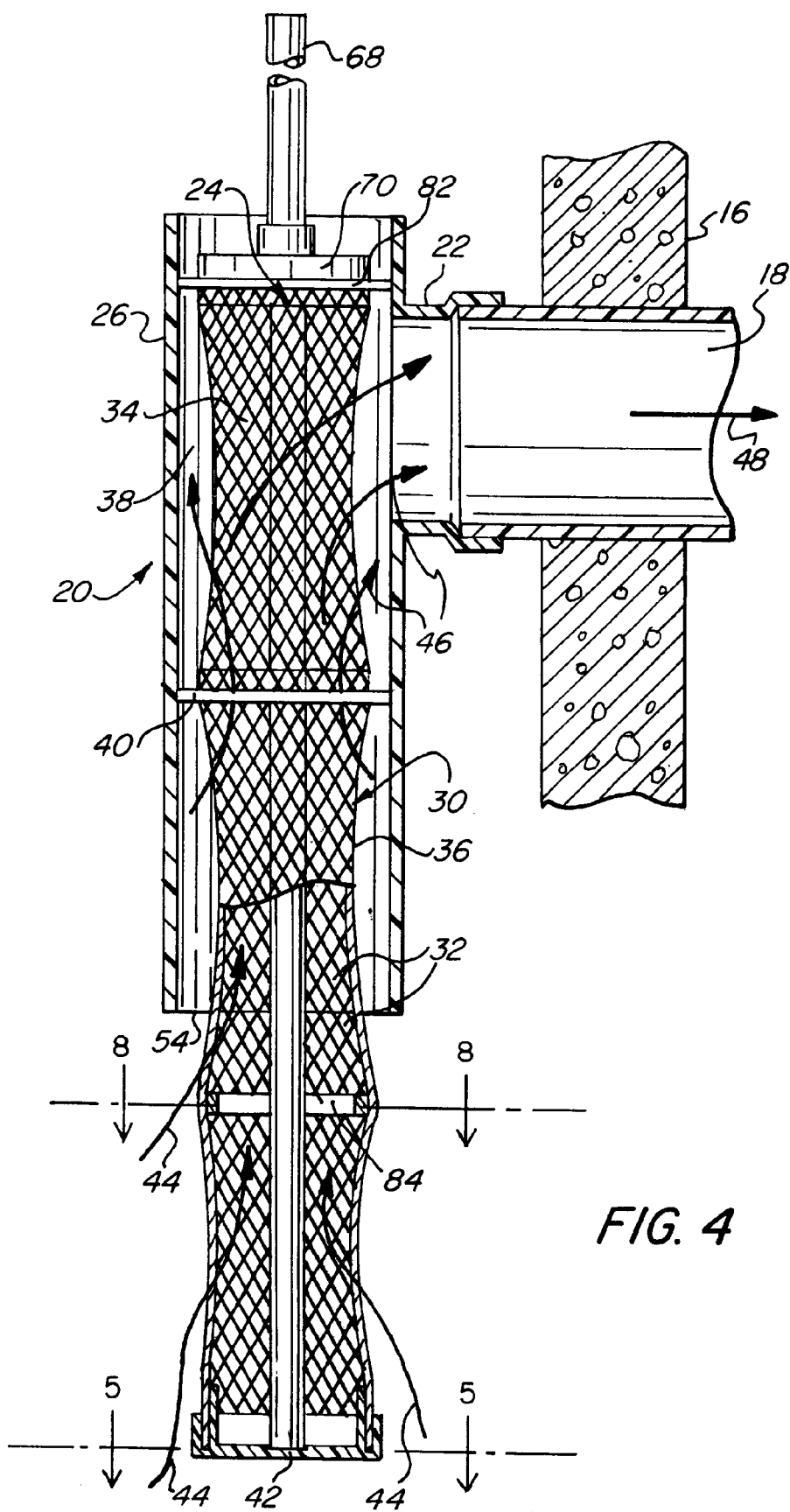
FIG. 4 is side cross-sectional view, partially broken away, of a filter casing portion of a septic tank system having installed therein another embodiment of a filter for filtering particulate matter from liquids in accordance with the present invention.
Figure 5A:
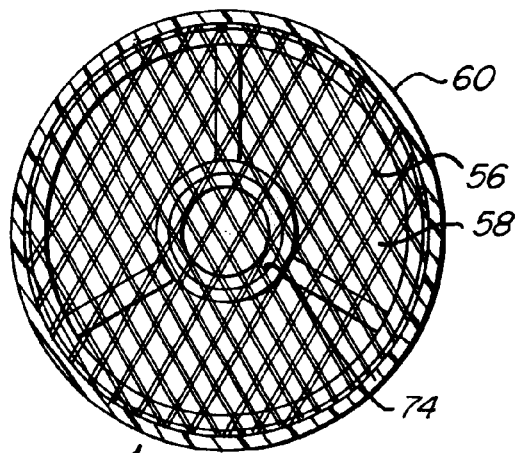
FIGS. 5A and 5B are cross-sectional views of various embodiments of a lower end member of the filter of FIG. 4, taken along line 5—5 of FIG. 4.
Figure 5B:
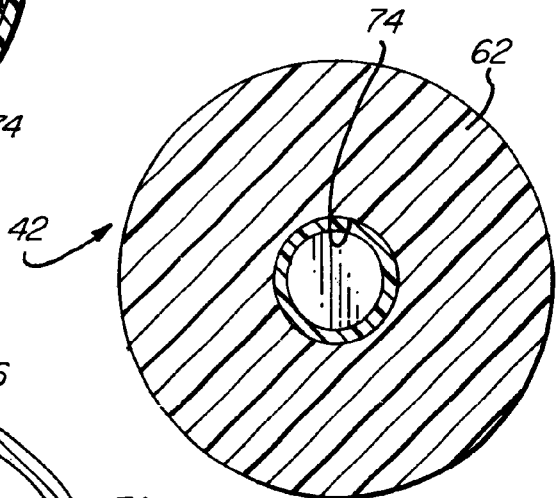
Figure 6A:
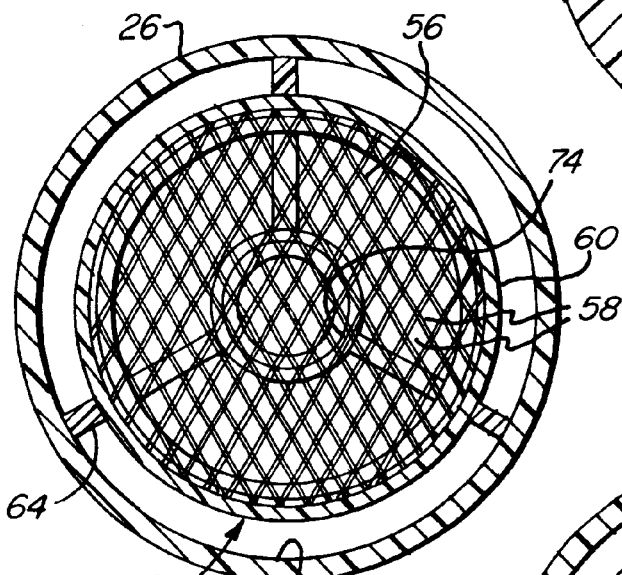
FIGS. 6A and 6B are cross-sectional views of various embodiments of a lower end member of the filter of FIG. 3, taken along line 6—6 of FIG. 3.
Figure 6B:
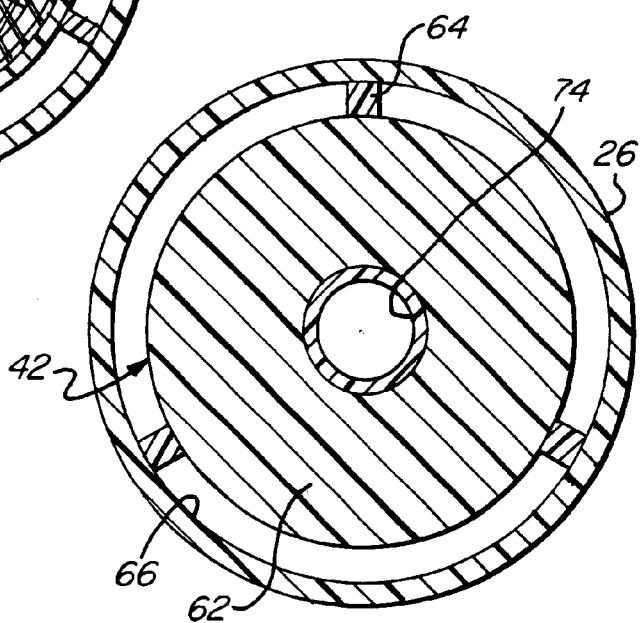

Referring now to FIGS. 3 and 4, a filter 24 for filtering particulate matter from liquids in accordance with the present invention is adapted to be received in filter casing 20. Filter casing 20 includes an outlet 22, a casing wall 26 and may or may not include an upper cap (not shown). The filter 24 includes a filter element 30 having a plurality of openings 32 therein for filtering particulate matter while allowing liquids to pass therethrough. The filter element 30 comprises a first section 34 located proximate to the outlet 22 in the casing 20 and a second section 36 adjacent to the first section 34. The filter element 30 is receivable in the casing 20 and spaced apart from the casing wall 26 such that the filter element 30 and the casing wall 26 define a space 38 therebetween. A seal 40 separates the first section 34 and the second section 36 of the filter element 30 and prevents the flow of liquid therearound in the space 38 between the filter element 30 and the casing wall 26. The seal 40 is located below the outlet 22 in the casing 20.

A lower end member 42 closes a lower end of the filter element 30, the lower end member 42 preventing the flow of unfiltered liquid and particulate matter into the filter element 30. Thus, fluid is forced to flow from outside the filter element 30 to inside the filter element 30 through the second section 36 (indicated by arrows 44), thereby filtering the fluid a first time, and then from inside the filter element 30 to outside the filter element 30 through the first section 34 into the space 38 defined by said filter element 30 and the casing wall 26 (indicated by arrows 46), thereby filtering the fluid a second time before the twice filtered fluid flows out through outlet 22 (indicated by arrow 48).

In one preferred embodiment shown in FIG. 3, the plurality of openings 50 in the first section 34 of the filter element 30 are smaller than the plurality of openings 52 in the second section 36 of the filter element 30, such that larger particles of matter are first filtered out by the second section 36 during a first pass of the liquid through the filter element 30 before smaller particles of matter are filtered out by the first section 34 during a second pass of the liquid through the filter element 30. When such is the case, the larger particles in the liquid cannot prematurely clog the smaller openings of the first section 34, as they are filtered out during the first pass through the filter 24.

Such a prevention of premature clogging may also be achieved by another preferred embodiment shown in FIG. 4. In this embodiment, premature clogging is prevented by the provision of a large surface area of filter material. This is achieved by moving seal 40 downward in casing 20 to increase the size of first section 34 of filter element 30, and by increasing the size of second section 36 of filter element 30 by extending it out beyond a lower end 54 of the casing 20.

Referring now to FIGS. 5A–6B, the lower end member 42 may comprise a filter material 56 having a plurality of openings 58 therein in order to further increase the filtering area of the second section 36 of filter element 30. (See FIGS. 5A and 6A). This may be achieved, for example, by providing a peripheral frame member 60 having filter material 56 attached thereto. Alternately, the lower end member 42 may comprise a solid member 62 having no openings therein. (See FIGS. 5B and 6B). It should be understood that regardless of the precise configuration of the end member 42 what is important is that the lower end member 42 prevents the flow of unfiltered liquid and particulate matter into the filter element 30.

When lower end member 42 is located within the wall 26 of filter casing 20 (see FIG. 3), it is also preferable that lower end member 42 comprises a plurality of centering elements 64 extending radially outwardly therefrom which are sized, shaped and positioned to engage an inner surface 66 of the casing wall 26 such that the filter element 30 is centered within the casing 20. (See FIGS. 6A and 6B). The number of centering elements 64 may vary, although it has been found that providing three centering elements 64 radially equally spaced provides excellent centering, while still allowing liquid to flow therearound.

Filter element 30 may comprise a rigid material having a plurality of openings therein, or may comprise a flexible mesh or screen material having a plurality of openings therein.

Preferably, the filter 24 also includes a rigid insertion member 68 and an upper end member 70 attached to an upper end of the filter element 30, the upper end member 70 having a hole 72 therein adapted to receive the insertion member 68 therein. The insertion member 68 protrudes from the top of upper end member 70 so as to facilitate grasping thereof, and the specific extent to which it so protrudes may vary. The lower end 42 member preferably has a recess 74 therein adapted to receive the insertion member 68 such that the insertion member 68 exerts a force on the lower member 42 as the filter 24 is being inserted into the casing 20. Such is most desirable when the filter element 30 comprises a flexible mesh or screen material so that the insertion member inhibits the filter element 30 from collapsing, although the rigid insertion member 68 may still be used when the filter element 30 comprises a rigid material to aid in installation.

Figure 7:
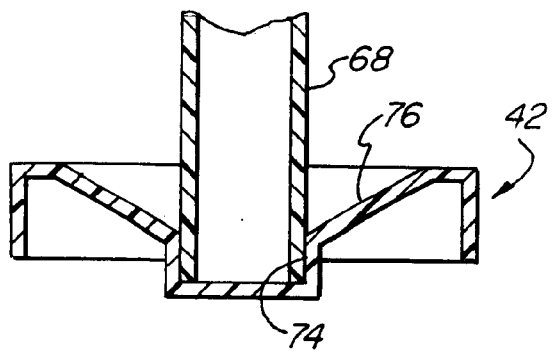
FIG. 7 is a cross-sectional side view of a preferred embodiment of the lower end member of the filter of FIG. 3 or FIG. 4.
Figure 9:
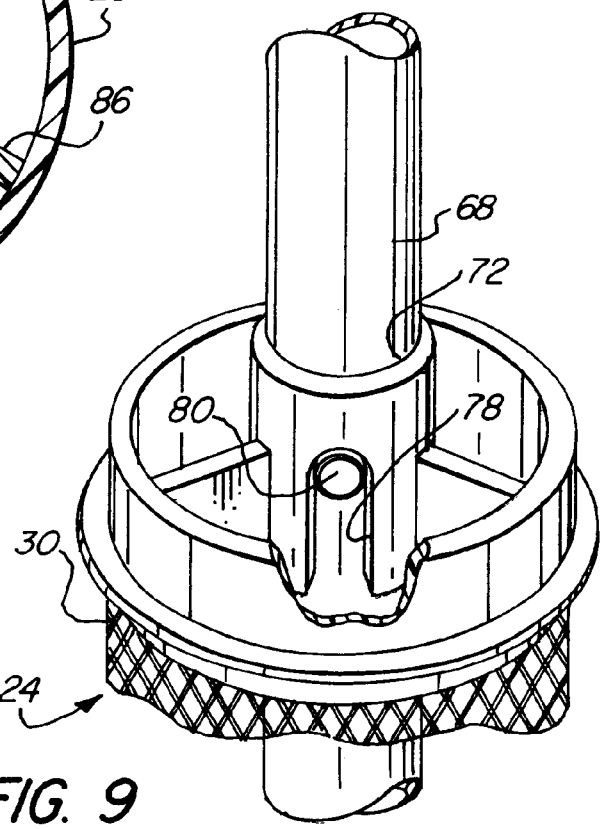

Most preferably, the insertion member 68 is removable from the filter element 30, and the lower end member 42 includes a taper 76 surrounding the recess 74 therein for facilitating insertion of the insertion member 68 into the recess 74 therein. (See FIG. 7). When the insertion member 68 is removable from the filter element 30, it is also most preferable that the upper end member 70 and the insertion member 68 include a means for detachably connecting the insertion member 68 to the filter element 30. Such attaching means may take the form, for example, of a channel 78 along hole 72 in upper end member 70 and a cooperating spring loaded retaining pin 80 projecting from a sidewall of insertion member 68. (See FIG. 9) Such a configuration allows insertion member 68 to be inserted through hole 72 in upper end member 70 and into recess 74 in lower end member 42, and exert a force on lower end member 42 to inhibit filter element 30 from collapsing, while spring loaded retaining pin 80 engages channel 78 in hole 72. After filter element 30 is fully installed, retaining pin 80 may be pressed, for example by a user's finger, so as to disengage retaining pin 80 from channel 78, and insertion member 68 may be removed from filter element 30. It should be understood, however, that it is not necessary for insertion member 68 to be removable, and insertion member 68, if provided, may be fixedly attached to filter element 30.

When an upper end member 70 is attached to an upper end of the filter element 30, is also preferable that the upper end member 70 have a seal 82 preventing the flow of liquid therearound in the space 38 between the filter element 30 and the casing wall 26, the seal being located above the outlet 22 in the casing. Such is preferable so that liquid flowing out through the first section 34 of the filter element is forced to flow through the outlet 22 in the casing.

Figure 8A:
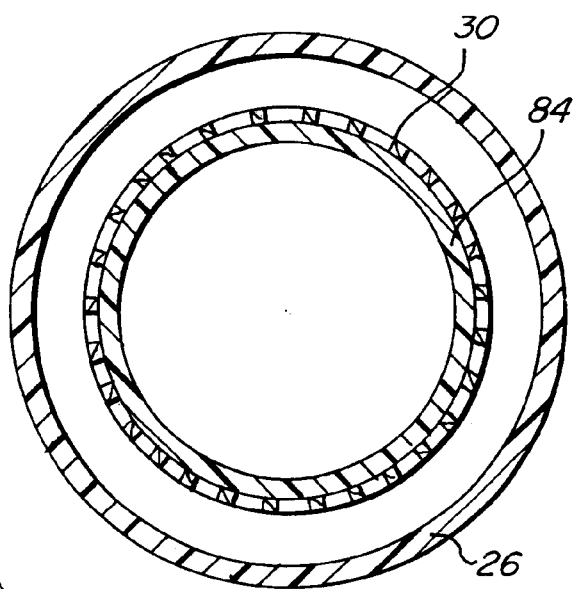
FIGS. 8A and 8B are cross-sectional views of various embodiments of a strengthening ring of the filter of FIGS. 3 and 4, taken along line 8—8 of FIGS. 3 and 4; and, FIG. 9 is a side isometric view of a top end member of the filter of FIG. 3 or FIG. 4.
Figure 8B:
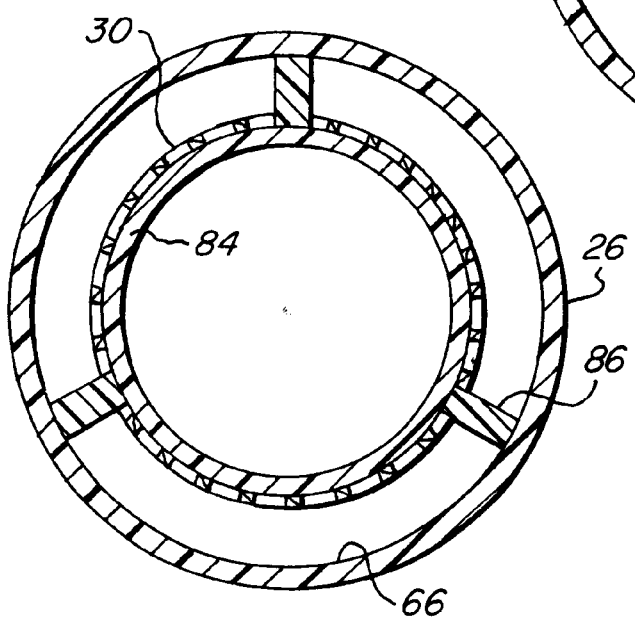

Moreover, the filter 24 preferably also includes at least one strengthening ring 84, best seen in FIGS. 8A and 8B) peripherally attached to the filter element 30 to provide strength and rigidity thereto. The strengthening rings 84 may be provided in either first section 34 or second section 36 or both, although provision in second section 36 may be preferable, as it is contemplated that second section 36 will typically be longer. Moreover, it should be understood that the provision of strengthening rings 84 is most desirable when the filter element 30 comprises a flexible mesh or screen material so that strengthening rings 84 inhibit the filter element 30 from collapsing, although the strengthening rings 84 may still be used when the filter element 30 comprises a rigid material to give added strength.

When strengthening rings 84 are located within the wall 26 of filter casing 20 (see FIG. 3), it is also preferable that strengthening rings 84 comprise a plurality of centering elements 86, similar to the centering elements 64 on lower end member 42, extending radially outwardly therefrom which are sized, shaped and positioned to engage an inner surface 66 of the casing wall 26 such that the filter element 30 is centered within the casing 20. (See FIG. 8B). The number of centering elements 86 may vary, although it has been found that providing three centering elements 86 radially equally spaced provides excellent centering, while still allowing liquid to flow therearound.

The present invention, therefore, provides a filter for filtering particulate matter from liquids which is inexpensive to produce, which is useful for filtering small as well as large particles, which is not prone to rapid clogging, and which is not limited in size by the length of the casing in which it is inserted.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A filter for filtering particulate matter from liquids, said filter being adapted to be received in a filter casing having a casing wall and an outlet, said filter comprising:

a filter element having a plurality of openings therein for filtering particulate matter while allowing liquids to pass therethrough, said filter element comprising a first section located proximate to the outlet in the casing and a second section adjacent to the first section, said filter element receivable in the casing and spaced apart from the casing wall such that said filter element and the casing wall define a space therebetween;

a seal separating the first section and the second section of said filter element and preventing the flow of liquid therearound in the space between the filter element and the casing wall, said seal being located below the outlet in the casing;

a rigid insertion member;

an upper end member attached to an upper end of said filter element, said upper end member having a hole therein adapted to receive said insertion member therein; and a lower end member closing a lower end of said filter element, said lower end member preventing the flow of unfiltered liquid and particulate matter into said filter element; wherein said lower end member has a recess therein adapted to receive said insertion member such that said insertion member exerts a force on said lower member as said filter is being inserted into the casing.

2. The filter of claim 1 wherein said lower end member comprises a filter material having a plurality of openings therein.

3. The filter of claim 1 wherein said lower end member comprises a solid member having no openings therein.

4. The filter of claim 1 wherein said filter element comprises a rigid material having a plurality of openings therein.

5. The filter of claim 1 wherein said filter element comprises a flexible mesh material having a plurality of openings therein.

6. The filter of claim 1 wherein said insertion member is removable from said filter element, and wherein said lower end member includes a taper surrounding the recess therein for facilitating insertion of said insertion member into the recess in said lower end member.

7. The filter of claim 1 wherein said insertion member is removable from said filter element, and wherein said upper end member and said insertion member include a means for detachably connecting said insertion member to said filter element.

8. The filter of claim 1 further comprising an upper end member attached to an upper end of said filter element, said upper end member having a seal preventing the flow of liquid therearound in the space between the filter element and the casing wall, said seal being located above the outlet in the casing, whereby liquid flowing out through the first section of said filter element is forced to flow through the outlet in the casing.

9. The filter of claim 1 wherein said lower end member comprises a plurality of centering elements extending radially outwardly therefrom which are sized, shaped and positioned to engage an inner surface of the casing wall of the casing such that said filter element is centered within said casing, while still allowing liquid to flow therearound.

10. The filter of claim 1 wherein further comprising at least one strengthening ring peripherally attached to said filter element to provide strength and rigidity thereto.

11. The filter of claim 10 wherein said strengthening ring comprises a plurality of centering elements extending radially outwardly therefrom which are sized, shaped and positioned to engage an inner surface of the casing wall of the casing such that said filter element is centered within said casing, while still allowing liquid to flow therearound.

12. The filter of claim 1 wherein the plurality of openings in the first section of said filter element are smaller than the plurality of openings in the second section of said filter element, such that larger particles of matter are first filtered out by the second section during a first pass of the liquid through said filter element before smaller particles of matter are filtered out by the first section during a second pass of the liquid through said filter element, whereby the larger particles cannot prematurely clog the smaller openings of the first section.

13. The filter of claim 1 wherein the second section of said filter element extends out beyond a lower end of the casing.

14. A filter for filtering particulate matter from liquids, said filter being adapted to be received in a filter casing having a casing wall and an outlet, said filter comprising:

a filter element comprising a flexible mesh material having a plurality of openings therein for filtering particulate matter while allowing liquids to pass therethrough, said filter element comprising a first section located proximate to the outlet in the casing and a second section adjacent to the first section, said filter element receivable in the casing and spaced apart from the casing wall such that said filter element and the casing wall define a space therebetween;

a seal separating the first section and the second section of said filter element and preventing the flow of liquid therearound in the space between the filter element and the casing wall, said seal being located below the outlet in the casing;

a rigid insertion member;

an upper end member attached to an upper end of said filter element, said upper end member having a hole therein adapted to receive said insertion member therein;

a lower end member closing a lower end of said filter element, said lower end member preventing the flow of unfiltered liquid and particulate matter into said filter element, wherein said lower end member has a recess therein adapted to receive said insertion member such that said insertion member exerts a force on said lower member as said filter is being inserted into the casing so as to inhibit said filter element from collapsing; and whereby fluid is forced to flow from outside said filter element to inside said filter element through the second section, thereby filtering the fluid a first time, and then from inside said filter element to outside said filter element through the first section, thereby filtering the fluid a second time.

15. The filter of claim 14, wherein said insertion member is removable from said filter element, and wherein said lower end member includes a taper surrounding the recess therein for facilitating insertion of said insertion member into the recess in said lower end member.

16. The filter of claim 14 wherein said insertion member is removable from said filter element, and wherein said upper end member and said insertion member include a means for detachably connecting said insertion member to said filter element.

* * * * *